United States Patent
Antony

(10) Patent No.: US 9,304,705 B2
(45) Date of Patent: Apr. 5, 2016

(54) VIRTUAL MACHINE CLONING

(71) Applicant: VMware, Inc., Palo Alto, CA (US)

(72) Inventor: Jinto Antony, Bangalore (IN)

(73) Assignee: VMware, Inc., Palo Alto, CA (US)

(*) Notice: Subject to any disclaimer, the term of this patent is extended or adjusted under 35 U.S.C. 154(b) by 152 days.

(21) Appl. No.: 14/020,303

(22) Filed: Sep. 6, 2013

(65) Prior Publication Data

US 2015/0074054 A1     Mar. 12, 2015

(51) Int. Cl.
  *G06F 3/06*      (2006.01)
  *G06F 17/30*     (2006.01)
  *G06F 9/455*     (2006.01)

(52) U.S. Cl.
  CPC ............ *G06F 3/065* (2013.01); *G06F 9/45558* (2013.01); *G06F 17/30088* (2013.01); *G06F 2009/45562* (2013.01)

(58) Field of Classification Search
  None
  See application file for complete search history.

(56) References Cited

U.S. PATENT DOCUMENTS

2009/0037680 A1*  2/2009  Colbert et al. ............... 711/162
2009/0265706 A1* 10/2009  Golosovker et al. ........... 718/1
2014/0195752 A1*  7/2014  Baron et al. ................. 711/162

OTHER PUBLICATIONS

Disk Chaining and Redo Logs, VMware vSphere 5.1, downloaded on Aug. 14, 2013 at: https://pubs.vmware.com/vsphere-51/index.jsp?topic=%2Fcom.vmware.vddk.pg.doc%2FvddkFunctions.6.8.html, 2 pages.
Linked Clone, VMware vSphere Blog, VMware Blogs, downloaded on Aug. 14, 2013 at: http://blogs.vmware.com/vsphere, 7 pages.
Virtual Machine Linked Clones in VMware, downloaded on Aug. 14, 2013 at: razorleaf.com/2009/12/linked-clones/, 5 pages.
Types of Clone: Full and Linked, VMware Workstation 5.0, Copyright 2013 VMware, Inc., downloaded on Aug. 20, 2013 at: https://www.vmware.com/support/ws5/doc/ws_clone_typeofclone_html, 1 page.
Understanding Clones, VMware Workstation 5.5, Copyright 2013 VMware, Inc., downloaded on Aug. 20, 2013 at: https://www.vmware.com/support/ws55/doc/ws_clone_overview.html, 2 pages.
VMware vSphere Storage APIs—Array Integration (VAAI), Technical Marketing Documentation V1.1, Technical White Paper, Copyright 2012 VMware, Inc., Dec. 2012, 19 pages.
Allen Bethea, What Is the VMDK Redo Log?, eHow, downloaded on Aug. 14, 2013 at: www.ehow.com/info_12229678_vmdk-redo-log.html, 3 pages.

* cited by examiner

Primary Examiner — Daniel Tsui

(57) ABSTRACT

Exemplary methods, apparatuses, and systems create a parent snapshot of the parent virtual disk in response to receiving a request to clone a parent virtual machine. A clone virtual machine is created with a clone redo log file and clone virtual disk. Copying of the parent virtual disk to the clone virtual disk is initiated. A first active link from the clone redo log file to the parent snapshot is created to provide the clone virtual machine access to the parent snapshot. In response to determining that the copying of the parent virtual disk to the clone virtual disk is complete, the first active link is removed and a second active link is created from the clone redo log file to the clone virtual disk or to a snapshot of the clone virtual disk.

20 Claims, 7 Drawing Sheets

VIRTUAL MACHINE CLONING

FIELD OF THE INVENTION

The various embodiments described herein relate to cloning virtual machines. In particular, the embodiments relate to cloning a virtual machine by creating and operating a linked clone while a virtual disk is copied in the background while the user can start using the virtual machine and converting the linked clone into a full clone once the virtual disk has been copied without any downtime for the cloned VM.

BACKGROUND OF THE INVENTION

A virtual machine clone is a copy of an existing virtual machine (VM). Cloning of VMs provides unique opportunities for managing a virtual environment while accomplishing tasks in a more productive manner. A cloned VM can take at least two forms: a full clone or a linked clone. As used herein, a full clone refers a copy of a VM that operates independently of the original. As used herein, a linked clone refers a copy of a parent VM that shares the virtual disk(s) of the parent VM in an ongoing manner and stores changes to the parent virtual disk data in its own virtual disk(s).

A full clone provides easy provisioning and better performance than a linked clone. When a VM has a large virtual disk (e.g., 100 gigabytes), however, the creation of the full clone takes significant amount of time. One full cloning solution offloads the cloning operation to the storage array to reduce the time needed for created the clone. This solution, however, depends upon storage arrays or specific hardware that supports the offloaded operation and is limited to source and destination VMs coupled to the same storage array.

A linked clone links to a snapshot of the parent VM and, therefore, is created in little time. The parent VM and linked VM each maintains changes to the virtual disk in separate, redo log files. Such changes by the parent VM do not affect the linked clone VM and vice versa. The linked clone conserves disk space and allows multiple VMs to use the same software installation within the parent. A linked clone, however, is dependent upon the functionality of the parent VM. If the parent VM's virtual disk is corrupted or damaged, both the parent and linked clone will fail. Additionally, the linked clone VM continues to grow over a period of time (based on usage) as a result of the changes written to the clone redo log file.

SUMMARY OF THE INVENTION

Exemplary methods, apparatuses, and systems create a parent snapshot of the parent virtual disk in response to receiving a request to clone a parent virtual machine. A clone VM is created with a clone redo log file and clone virtual disk. Copying of the parent virtual disk to the clone virtual disk is initiated in the background. A first active link from the clone redo log file to the parent snapshot is created to provide the clone virtual machine access to the parent snapshot. A passive link from the clone redo log file to the clone virtual disk in response to the received request is also created. While the parent virtual disk is copied, the clone virtual machine operates as a linked clone via the first active link. In one embodiment, migration of the parent virtual disk is disabled while the parent virtual disk is copied. In one embodiment, copying the parent virtual disk includes copying the parent snapshot.

In response to determining that the copying of the parent virtual disk to the clone virtual disk is complete, the first active link is removed and the passive link is converted to an active link. The redo log files are merged into their respective virtual disks and snapshots are deleted. The clone VM proceeds to operate independently of the parent VM (i.e., as a full clone).

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein create a linked clone VM while a parent virtual disk is copied to the clone. As a result, the creation and operation of the clone VM is not delayed due to copying a large virtual disk, e.g., that may occur when simply creating a full clone. While operating as a linked clone, a user can start using the cloned VM without restriction and the parent virtual disk is copied to the clone VM in the background. Upon completing the copy of the parent virtual disk to the clone virtual disk, the linked clone VM is converted into a full clone VM. As a result, the clone VM benefits from improved performance and independence from the parent VM.

Figure 1A:
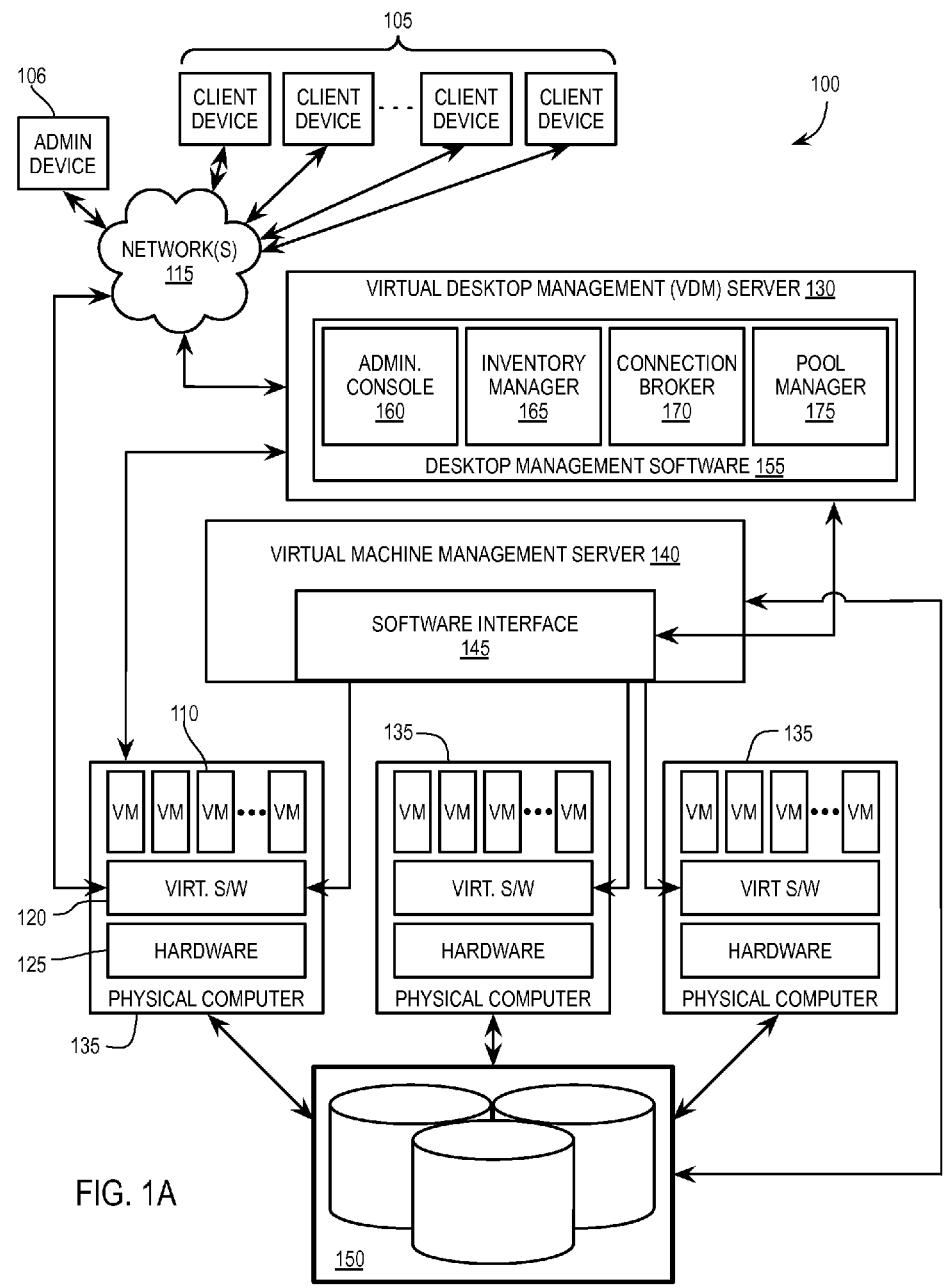
FIGS. 1A and 1B illustrate, in block diagram form, an exemplary virtual datacenter environment including one or more networked processing devices implementing virtual machine cloning.

FIG. 1A illustrates, in block diagram form, an exemplary virtual datacenter environment 100 including one or more networked processing devices implementing virtual machine cloning. Server-based computing in a virtual datacenter environment allows client devices 105 to access centrally-managed user virtual desktops, such as those implemented by VMs 110, via network(s) 115 (e.g., a local area network or other private or publically accessible wide area network, such as the Internet). For example, client device 105 and VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 110.

The term "desktop," as used herein, refers to a human interface environment through which users can launch, interact with, and manage applications, settings, and/or data, etc. A virtual desktop is a virtual computing system that operates as a desktop or workstation computer with which an end user can interact using a desktop remoting protocol and the software and/or hardware of client device 105. A virtualized desktop may export user interfaces, e.g., keyboard and mouse input, audio and visual output, to client device 105 from VM 110 running remotely (in the datacenter) or locally on client device 105, or, in some cases, using a hybrid. Client device 105 transmits user input, e.g., keyboard or mouse input, to VM 110 to be processed, and receives display and other data, such as sound, from VM 110 for presentation to a user of client device 105. Client device 105 presents a bitmap representation of the desktop generated by VM 110. Input to and output from the virtualized desktop are reflected in the bitmap representation on client device 105 as it occurs on the virtualized desktop within VM 110.

VMs 110 are complete computation environments, containing virtual equivalents of the hardware and system software components of a physical system and are typically implemented by an extensive virtualization infrastructure, which includes a variety of software and hardware components. A virtualization software layer 120 (e.g., a hypervisor) running on hardware 125 of physical computer 135 manages one or more VMs 110. Virtualization software layer 120 manages physical resources, e.g., hardware 125, as well as maintains virtual-to-physical hardware mappings.

Remote access to virtualized desktops is generally provided to client devices 105 through virtual desktop management (VDM) server 130. The VDM server 130 provides virtual desktop access to the client devices 105 and manages the corresponding VMs 110 through communications with software interface 145 of virtual machine management server (VMMS) 140. VMMS 140 is responsible for provisioning and maintaining the multitude of VMs 110 implemented across one or more physical computers 135 as well as storage 150 utilized by VMs 110.

VDM server 130 may be a physical computer system or a virtual machine that runs desktop management software 155. Desktop management software 155 within VDM server 130 manages pools of computer resources to run VMs 110 on a set of clusters typically including multiple servers/physical computers 135 with central/graphics processing units (CPU's and/or GPU's), memory, and communications hardware. Desktop management software 155 includes a number of modules, including administrative console 160, inventory manager 165, connection broker 170, and pool manager 175.

Administrative console 160 provides a remotely accessible user interface to administrator device 106 to manage the configuration of virtual desktops within the virtual datacenter 100. In one embodiment, administrative console 160 exports a graphical user interface via hypertext transfer protocol (HTTP) to be accessed by a web browser. Alternatively, a command-line interface or a rich client is provided to administrator device 106, which includes a web browser to access the administrative console. Administrative console 160 allows administrator device 106 to perform a plurality of functions, such as: cloning VMs, create desktop pools, associate desktop pools with VDM server 130, associate a desktop pool with a master image, define VM state policies, setup custom messages to be sent to users (e.g., when the desktops are put into maintenance mode for weekly patches, hotfixes, etc.), set storage overcommit settings for different data stores 150 used by desktop pools, perform rebalance operations on a set of virtual desktops, and other similar operations.

Inventory manager 165 handles the events received from the virtual desktops. When a user logs off or disconnects, a software agent running within a VM 110 sends a notification to inventory manager 165. Inventory manager 165 determines an effective policy that applies to the desktop and performs a maintenance operation, if required. Inventory manager 165 may also use timer-based events to schedule effective maintenance operations.

Connection broker 170 allows a remote user or administrator, through a client or administrator device 105, 106, to select a type of virtual desktop and initiate a virtual desktop session or to access an existing connection to a virtual desktop. In one embodiment, connection broker 170 connects to VM 110 to access or update policies associated with VM 110 (e.g., to enable or prohibit virtual desktop shadowing).

Pool manager 175 manages the lifecycle of virtual desktops. Virtual desktops in a pool are grouped together based on similar software requirements. Desktop Administrators create logical desktops groups (desktop pools) that are provisioned typically from the same base image. For example, a desktop pool may include cloned VMs 110 that run the same set of software applications and run the same operating system.

In general, VMMS 140 provides software interface 145 to enable an administrator or other entity, such as inventory manager 165, connection broker 170, and pool manager 175, to access and manage VMs 110 as described above. Additionally, VMMS 140 supports operations for the discovery of compute, storage, and network resources; creation of logical compute pools by providing features such as automatic CPU and memory load balancing; provisioning/creation of one or more virtual disks, on local or shared storage-clones with full or sparse disks; creation of cloned VMs; and power operations on virtual machines (power on, power-off, suspend, resume, checkpoint, etc.). While illustrated as separate components, in one embodiment, a single server or other networked processing device implements VDM server 130 and VMMS 140. For example, VDM server 130 and VMMS 140 may be implemented by one or more VMs 110.

Figure 1B:
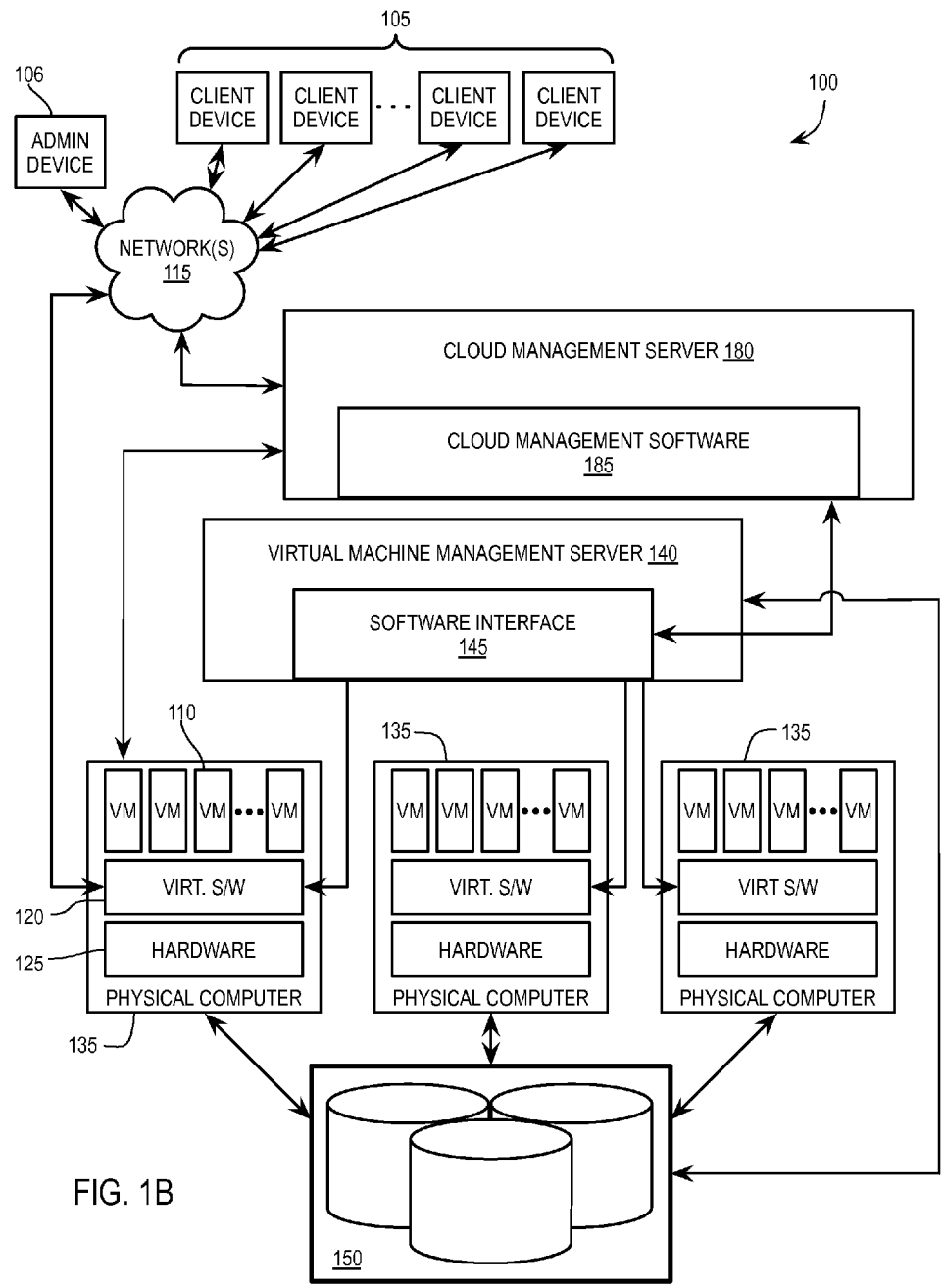

FIG. 1B further illustrates exemplary virtual datacenter environment 100. In addition to VDM server 130 (or alternatively), virtual datacenter 100 includes cloud management server 180. Cloud management server 180 includes cloud management software 185 to orchestrate the provisioning of software defined datacenter services. Exemplary services include virtualized compute, networking, storage, and security services that implement the infrastructure of virtual datacenter 100. Additionally, cloud management software 185 utilizes VM cloning to dramatically expedite the provisioning of and access to said infrastructure.

Similar to VDM server 130, cloud management server 180 provides a remotely accessible user interface to administrator device 106 to manage the configuration of virtual services within the virtual datacenter 100. For example, the user interface allows administrator device 106 to perform a plurality of functions, such as: cloning VMs, configuring firewall and other networking/security services, adding servers, isolating multi-tenant organizations, creating datacenter service templates, defining role-based access, monitoring processor, memory, and storage usage/allocation, pooling resources, and other similar operations.

While illustrated as separate components, in one embodiment, a single server or other networked processing device implements cloud management server 180 and VMMS 140. For example, cloud management server 180 and VMMS 140 may be implemented by one or more VMs 110.

Figure 2:
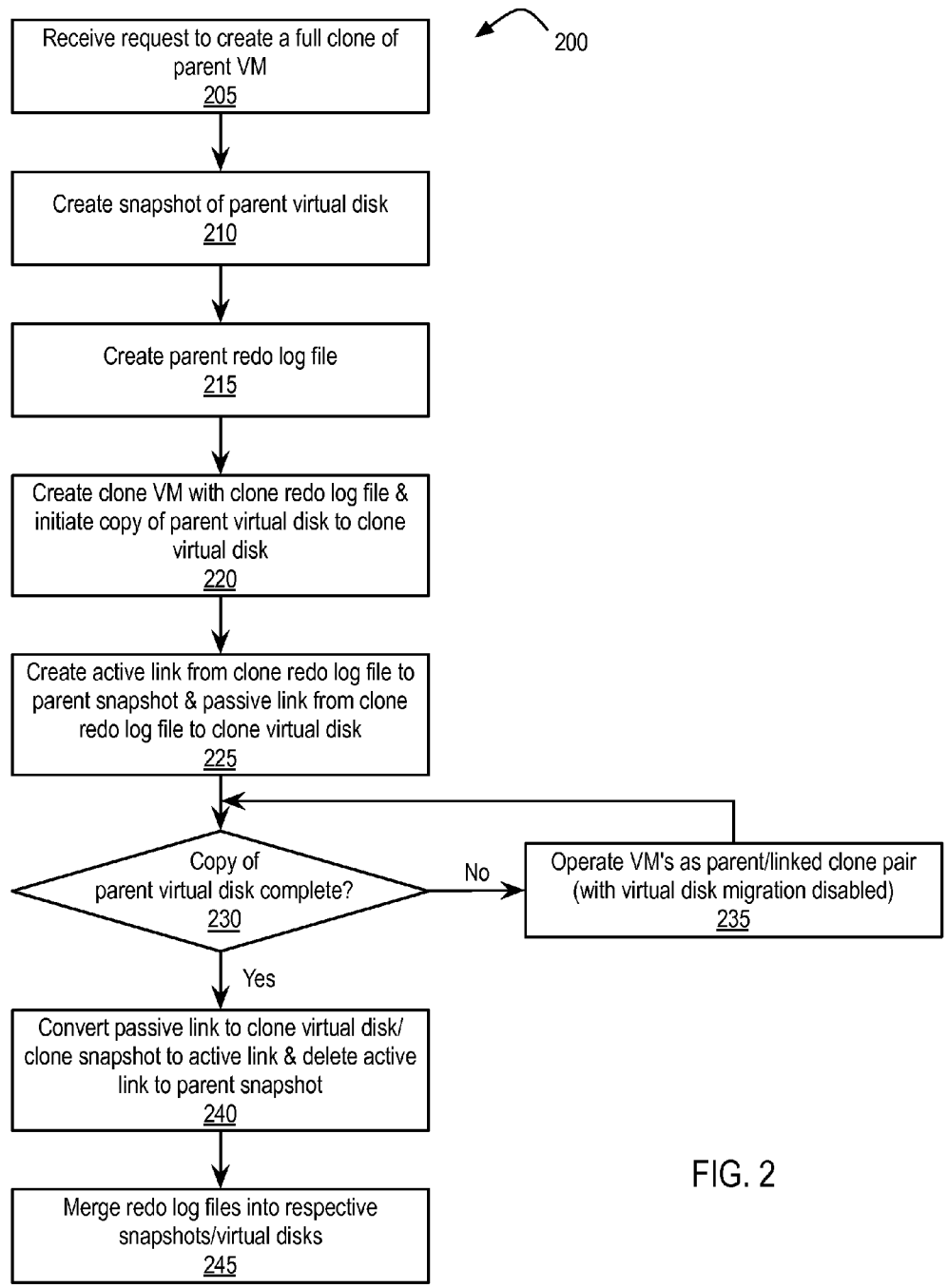
FIG. 2 is a flow chart illustrating an exemplary method of virtual machine cloning.

FIG. 2 is a flow chart illustrating exemplary method 200 of virtual machine cloning. In one embodiment, one or more of virtualization software 120 within one or more host devices 135, VDM 130, VMMS 140, and data store 150 (alone or in combination) performs method 200. For simplicity of explanation, these embodiments will be described with reference to "a processing device" performing method 200.

At block 205, the processing device receives a request to create a full clone of a parent VM. For example, a user or administrator utilizes a user or administrator device 105/106 to connect to VDM 130 to select an existing VM 110 from an inventory of VMs 110 to clone. The user or administrator utilizes a user or administrator device 105/106 to further select a host device 135 for the cloned VM.

At block 210, in response to receiving the request to create a full clone of the parent VM, the processing device creates a snapshot of the parent virtual disk. For example, the snapshot may be a read-only copy of the virtual disk at the point in time at which the cloning request is processed.

At block 215, further in response to receiving the request to create a full clone of the parent VM, the processing device creates a redo log file for the parent VM. The parent redo log file, also referred to as a child disk or delta disk, stores virtual disk changes made by the parent VM after the snapshot is created.

Figure 3:
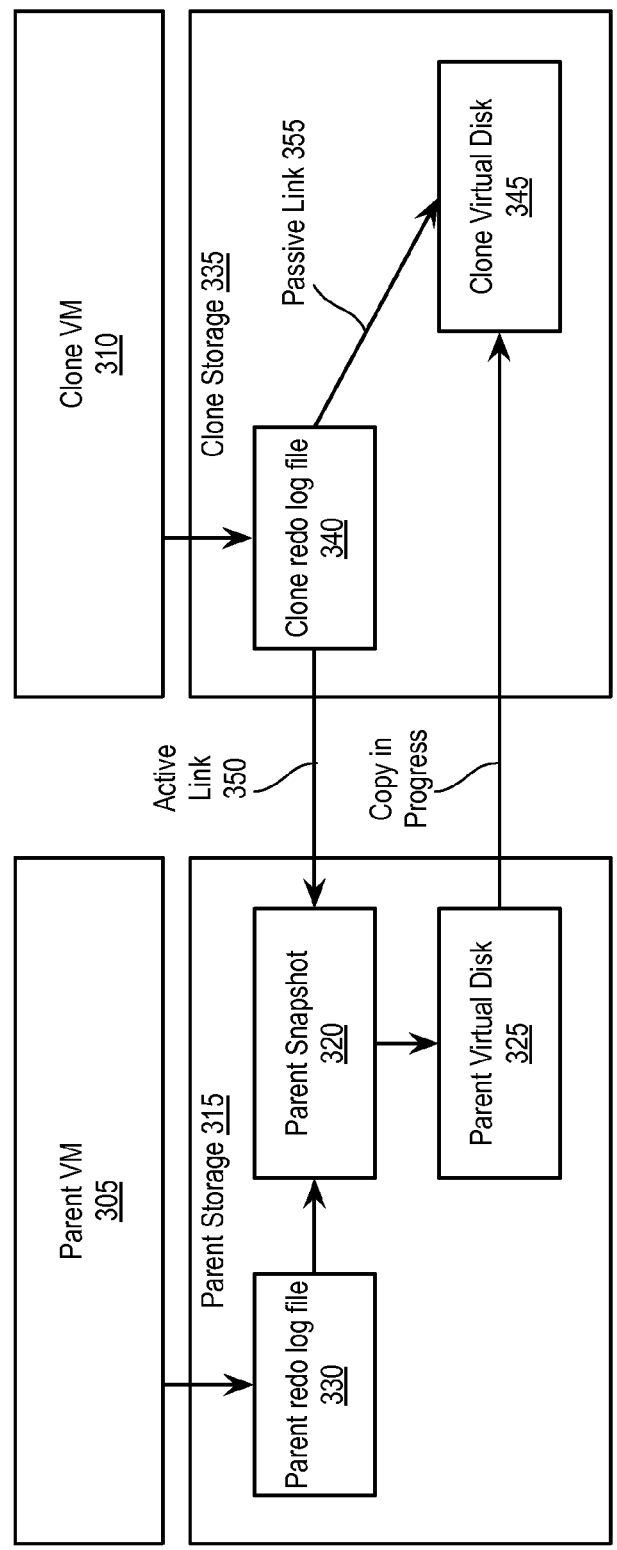
FIG. 3 illustrates, in block diagram form, exemplary parent and clone virtual machines during cloning.

FIG. 3 illustrates, in block diagram form, exemplary parent VM 305 and clone VM 310 during cloning. Parent VM 305 is coupled to parent storage 315. One or both of hardware 125 of a host device 135 and data store(s) 150 may implement parent storage 315. As described above, parent snapshot 320 is created from parent virtual disk 325. Parent redo log file 330 is created and linked to parent snapshot 320. Additionally, parent VM 305 is linked to parent redo log file 330. Parent VM 305 is able to continue operating while saving virtual disk changes to parent redo log file 330.

Returning to FIG. 2, at block 220 and further in response to receiving the request to create a full clone of the parent VM, the processing device creates the clone VM with a clone redo log file. Similar to the parent redo log file, the clone redo log file stores the clone's virtual disk changes. Additionally, the processing device initiates the copying of the parent virtual disk to the clone virtual disk.

As discussed above, one or more physical devices may implement the creation of the snapshot and the copying of the parent virtual disk. In one embodiment, host device 135 implementing parent VM 110 creates the snapshot and/or copies the parent virtual disk to the clone virtual disk. For example, host device 135 issues read and write commands to one or more data store(s) 150. In one embodiment, the creation of the snapshot and/or copying of the parent virtual disk are offloaded to data store(s) 150. For example, host device 135 issues a command to data store(s) 150 to create the snapshot or copy the parent virtual disk.

At block 225, further in response to receiving the request to create a full clone of the parent VM, the processing device creates an active link from the clone redo log file to the parent snapshot to provide the clone virtual machine access to the parent snapshot and otherwise operate as a linked clone VM. In one embodiment, the processing device further creates a passive link from the clone redo log file to the clone virtual disk in anticipation of switching the clone VM from operating as a linked clone to a full clone without any down time for the clone VM.

Referring again to FIG. 3, clone VM 310 is coupled to clone storage 335. In particular, clone VM 310 is linked to clone redo log file 340. While parent storage 315 and clone storage 335 are illustrated as separate components, in one embodiment, parent storage 315 and clone storage 335 are implemented within a single storage device. Similar to parent storage 315, one or both of hardware 125 of a host device 135 and data store(s) 150 may implement clone storage 335. Clone redo log is actively linked 350 to parent snapshot 320 to enable clone VM 310 to operate as a linked clone while the copy of parent virtual disk 325 to clone virtual disk 345 is in progress. Additionally, clone redo log file 340 is passively linked 355 to clone virtual disk 345.

Returning to FIG. 2, at block 230, the processing device determines if the copy of the parent virtual disk to the clone virtual disk is complete. If not, at block 235, the parent and clone VMs operate as a parent and linked clone pair. Each VM stores individual virtual disk changes to the parent/clone redo log file, respectively. In one embodiment, migration of the parent virtual disk or any other operation on parent virtual disk is disabled while the parent virtual disk is copied to the clone virtual disk. Method 200 continues with the VMs operating as a linked pair until the copying is complete.

In response to the completion of copying the parent virtual disk to the clone virtual disk, at block 240, the processing device converts the passive link to an active link and deletes the active link between the clone redo log file and the parent snapshot. In one embodiment, the copying of the parent virtual disk includes copying the parent snapshot to a clone snapshot. Alternatively, a clone snapshot is created upon completion of copying the parent virtual disk. With a clone snapshot linked to the clone virtual disk, the processing device moves the passive link between the clone redo log file and the clone virtual disk to a passive link between the clone redo log file and the clone snapshot. As a result, the conversion of the passive link to an active link creates an active link between the clone redo log file and the clone snapshot.

Figure 4:
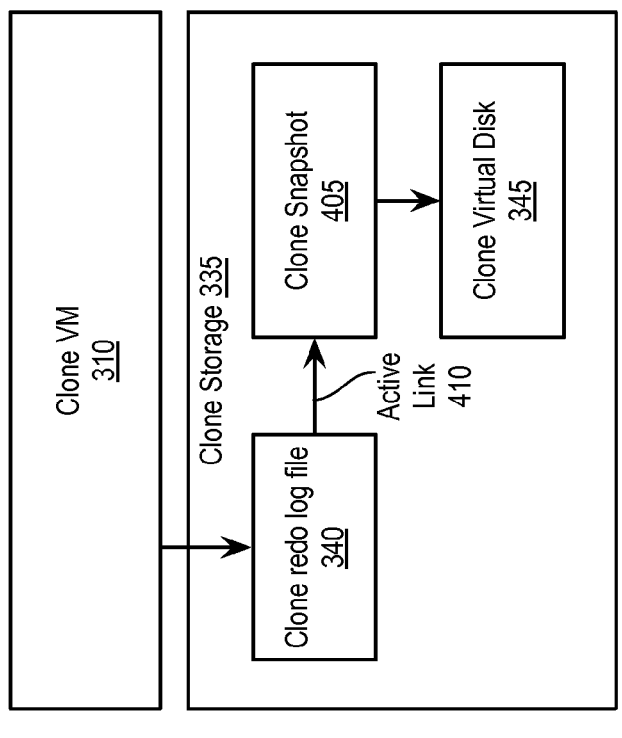
FIG. 4 illustrates, in block diagram form, exemplary parent and clone virtual machines during cloning.
Figure 4:
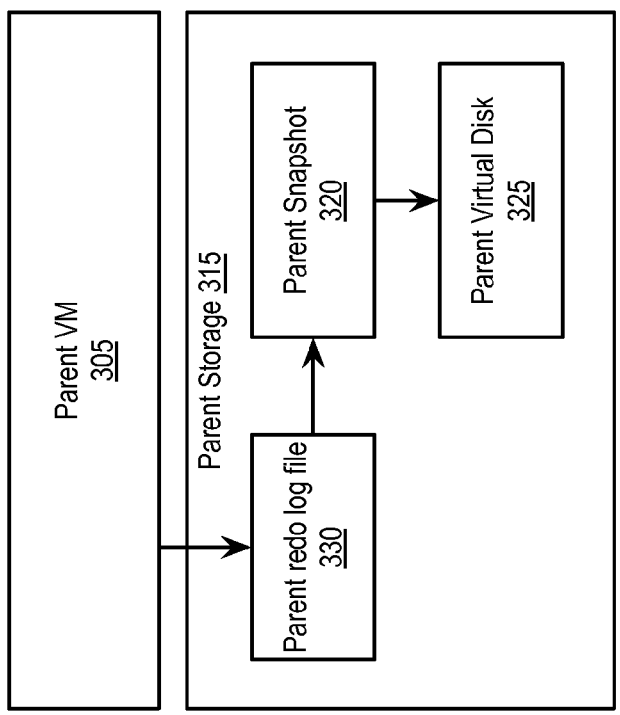

FIG. 4 illustrates, in block diagram form, exemplary parent VM 305 and clone VM 310 after copying of parent virtual disk 325 to clone virtual disk 345 is complete. Clone snapshot 405 is linked to clone virtual disk 345. Active link 350 between clone redo log file 340 and parent snapshot 320 has been removed. Passive link 355 between clone redo log file 340 and clone virtual disk 345 has been converted to active link 410 between clone redo log file 340 and clone snapshot 405. As a result, clone VM 310 may now operate independently of parent VM 305 and parent storage 315 (e.g., by storing changes to clone virtual disk 345/clone snapshot 405 in clone redo log file 340). In an alternate embodiment, the processing device omits the creation of passive link 355 and creates active link 410 after copying of parent virtual disk 325 to clone virtual disk 345 is complete. In yet another embodiment, the processing device omits the creation of clone snapshot 405 and active link 410 is created/converted to an active link between clone between clone redo log file 340 and clone virtual disk 345 after copying of parent virtual disk 325 to clone virtual disk 345 is complete.

Returning to FIG. 2, at block 245 and further in response to the completion of copying the parent virtual disk to the clone virtual disk, the processing device optionally merges the parent and clone redo log files, respectively, into the parent and clone virtual disks. For example, the processing device implements the cumulative changes to the snapshot of the parent virtual disk stored in the redo log files directly to the parent and clone virtual disks.

Figure 5:
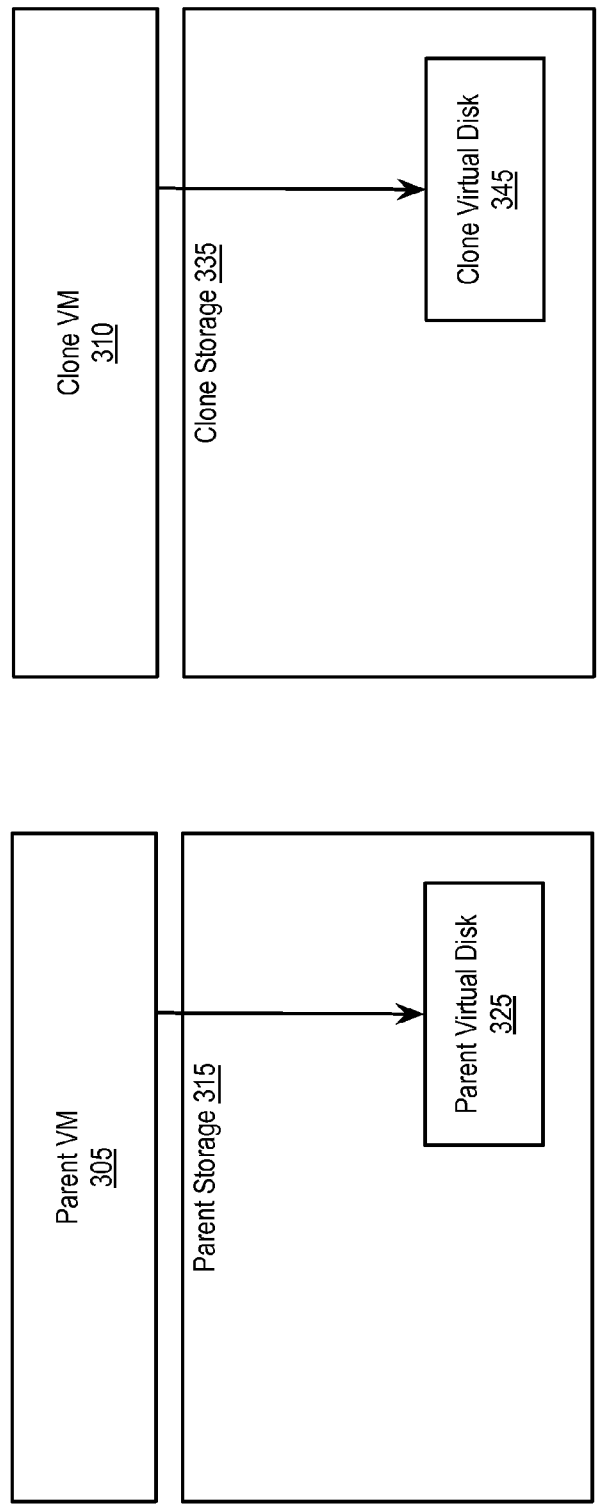
FIG. 5 illustrates, in block diagram form, exemplary parent and clone virtual machines after cloning.

FIG. 5 illustrates, in block diagram form, exemplary parent VM 305 and clone VM 310 after cloning. Parent redo log file 330 has been merged into parent virtual disk 325. Parent redo log file 330 and parent snapshot 320 have been deleted. Parent VM 305 is linked to parent virtual disk 325. Similarly, clone redo log file 340 has been merged into clone virtual disk 345. Clone redo log file 340 and clone snapshot 405 have been deleted. Clone VM 310 is linked to clone virtual disk 345.

In one embodiment, the processing device determines if any additional clone VMs are still linked to the parent snapshot. For example, a second clone VM may have been created and the copy of the parent virtual disk to the second clone VM may not yet be complete. In such an embodiment, the processing device does not merge the parent redo log file into the parent virtual disk and the parent snapshot is not deleted (e.g., at least until the copying of the parent virtual disk to all clone virtual disks is complete).

Figure 6:
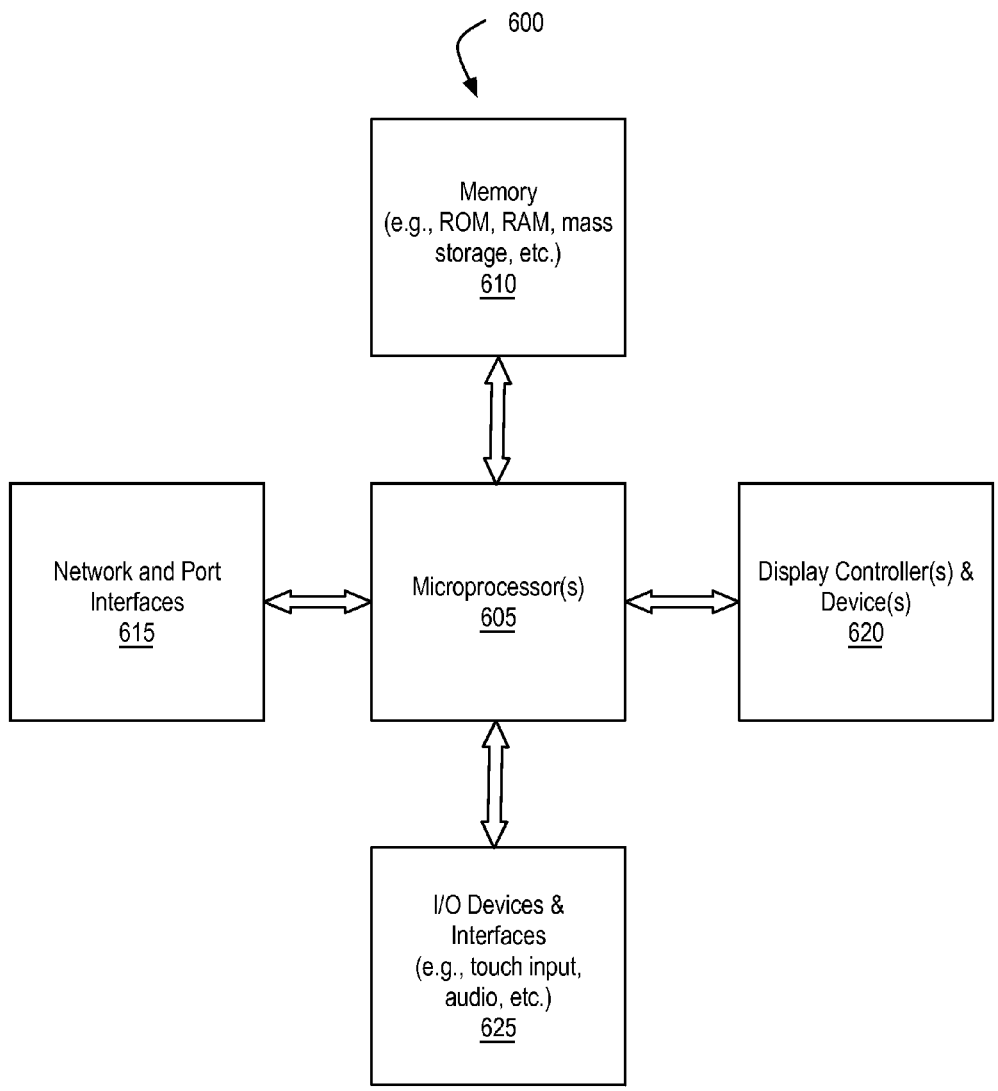
FIG. 6 illustrates, in block diagram form, an exemplary processing system to implement virtual machine cloning.

FIG. 6 illustrates, in block diagram form, exemplary processing system 600 to perform virtual machine cloning. Data processing system 600 includes one or more microprocessors 605 and connected system components (e.g., multiple connected chips). Alternatively, data processing system 600 is a system on a chip.

Data processing system 600 includes memory 610, which is coupled to microprocessor(s) 605. Memory 610 may be used for storing data, metadata, and programs for execution by the microprocessor(s) 605. Memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 610 may be internal or distributed memory (e.g., including external data stores). In one embodiment, one or more components within parent storage 315 or clone storage 335 is implemented within memory 610.

Data processing system 600 includes network and port interfaces 615, such as a port, connector for a dock, or a connector for a USB interface, FireWire, Thunderbolt, Ethernet, Fibre Channel, etc. to connect the system 600 with another device, external component, or a network. Exemplary network and port interfaces 615 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 600 with another device, external component, or a network and receive stored instructions, data, tokens, etc.

Data processing system 600 also includes display controller and display device 620 and one or more input or output ("I/O") devices and interfaces 625. Display controller and display device 620 provides a visual user interface for the user. I/O devices 625 allow a user to provide input to, receive output from, and otherwise transfer data to and from the system. I/O devices 625 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 6.

Data processing system 600 is an exemplary representation of one or more of the client device(s) 105, administrator device 106, VDM server 130, host device(s) 135, VMMS 140, and cloud management server 180 described above. Data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 600 may be a network computer, server, or an embedded processing device within another device or consumer electronic product. As used herein, the terms computer, device, system, processing system, processing device, and "apparatus comprising a processing device" may be used interchangeably with data processing system 600 and include the above-listed exemplary embodiments.

It will be appreciated that additional components, not shown, may also be part of data processing system 600, and, in certain embodiments, fewer components than that shown in FIG. 6 may also be used in data processing system 600. It will be apparent from this description that aspects of the inventions may be embodied, at least in part, in software. That is, the computer-implemented method 100 may be carried out in a computer system or other data processing system 600 in response to its processor or processing system 605 executing sequences of instructions contained in a memory, such as memory 610 or other non-transitory machine-readable storage medium. The software may further be transmitted or received over a network (not shown) via network interface device 615. In various embodiments, hardwired circuitry may be used in combination with the software instructions to implement the present embodiments. Thus, the techniques are not limited to any specific combination of hardware circuitry and software, or to any particular source for the instructions executed by data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
in response to receiving a request to create a full clone of a parent virtual machine, the parent virtual machine having a parent virtual disk,
creating a parent snapshot of the parent virtual disk,
creating a parent redo log file linked to the parent virtual disk, wherein the parent redo log stores virtual disk changes made by the parent virtual machine after the parent snapshot is created,
creating a clone virtual machine with a clone redo log file and clone virtual disk,
initiating copying of the parent virtual disk to the clone virtual disk, and
creating a first active link from the clone redo log file to the parent snapshot to provide the clone virtual machine access to the parent snapshot; and
in response to determining that the copying of the parent virtual disk to the clone virtual disk is complete,
removing the first active link, and
creating a second active link from the clone redo log file to the clone virtual disk or a snapshot of the clone virtual disk.

2. The computer-implemented method of claim 1, further comprising:
creating a passive link from the clone redo log file to the clone virtual disk in response to the received request, wherein creating the second active link includes converting the passive link to an active link.

3. The computer-implemented method of claim 2, wherein copying the parent virtual disk to the clone virtual disk includes copying the parent snapshot to a clone snapshot, and wherein the passive link from the clone redo log file to the clone virtual disk is changed to a passive link from the clone redo log file to the clone snapshot.

4. The computer-implemented method of claim 1, further comprising:
merging the clone redo log file into the clone virtual disk.

5. The computer-implemented method of claim 4, wherein copying the parent virtual disk to the clone virtual disk includes copying the parent snapshot to a clone snapshot, and wherein merging the clone redo log file into the clone virtual disk includes deleting the clone snapshot.

6. The computer-implemented method of claim 1, further comprising:
in response to determining that the copying of the parent virtual disk to the clone virtual disk is complete, merging the parent redo log file into the parent virtual disk and deleting the parent snapshot.

7. The computer-implemented method of claim 1, further comprising:
disabling migration of the parent virtual disk while copying the parent virtual disk to the clone virtual disk.

8. The computer-implemented method of claim 1, wherein virtual disk changes resulting from operation of the clone virtual machine while copying the parent virtual disk to the clone virtual disk are stored in the clone redo log file.

9. A non-transitory computer-readable medium storing instructions, which when executed by a processing device, cause the processing device to perform a method comprising:
in response to receiving a request to create a full clone of a parent virtual machine, the parent virtual machine having a parent virtual disk,
creating a parent snapshot of the parent virtual disk,
creating a parent redo log file linked to the parent virtual disk, wherein the parent redo log stores virtual disk changes made by the parent virtual machine after the parent snapshot is created,
creating a clone virtual machine with a clone redo log file and clone virtual disk,
initiating copying of the parent virtual disk to the clone virtual disk, and
creating a first active link from the clone redo log file to the parent snapshot to provide the clone virtual machine access to the parent snapshot; and
in response to determining that the copying of the parent virtual disk to the clone virtual disk is complete,
removing the first active link, and
creating a second active link from the clone redo log file to the clone virtual disk or a snapshot of the clone virtual disk.

10. The non-transitory computer-readable medium of claim 9, the method further comprising:
creating a passive link from the clone redo log file to the clone virtual disk in response to the received request, wherein creating the second active link includes converting the passive link to an active link.

11. The non-transitory computer-readable medium of claim 10, wherein copying the parent virtual disk to the clone virtual disk includes copying the parent snapshot to a clone snapshot, and wherein the passive link from the clone redo log file to the clone virtual disk is changed to a passive link from the clone redo log file to the clone snapshot.

12. The non-transitory computer-readable medium of claim 9, the method further comprising:
merging the clone redo log file into the clone virtual disk.

13. The non-transitory computer-readable medium of claim 9, wherein copying the parent virtual disk to the clone virtual disk includes copying the parent snapshot to a clone snapshot, and wherein merging the clone redo log file into the clone virtual disk includes deleting the clone snapshot.

14. The non-transitory computer-readable medium of claim 9, the method further comprising:
in response to determining that the copying of the parent virtual disk to the clone virtual disk is complete, merging the parent redo log file into the parent virtual disk and deleting the parent snapshot.

15. The non-transitory computer-readable medium of claim 9, the method further comprising:
disabling migration of the parent virtual disk while copying the parent virtual disk to the clone virtual disk.

16. The non-transitory computer-readable medium of claim 9, wherein virtual disk changes resulting from operation of the clone virtual machine while copying the parent virtual disk to the clone virtual disk are stored in the clone redo log file.

17. An apparatus comprising:
a processing device, wherein the processing device executes instructions that cause the apparatus to perform a method comprising:
in response to receiving a request to create a full clone of a parent virtual machine, the parent virtual machine having a parent virtual disk,
creating a parent snapshot of the parent virtual disk,
creating a parent redo log file linked to the parent virtual disk, wherein the parent redo log stores virtual disk changes made by the parent virtual machine after the parent snapshot is created,
creating a clone virtual machine with a clone redo log file and clone virtual disk, initiating copying of the parent virtual disk to the clone virtual disk, and creating a first active link from the clone redo log file to the parent snapshot to provide the clone virtual machine access to the parent snapshot; and in response to determining that the copying of the parent virtual disk to the clone virtual disk is complete, removing the first active link, and creating a second active link from the clone redo log file to the clone virtual disk or a snapshot of the clone virtual disk.

18. The apparatus of claim 17, the method further comprising:

creating a passive link from the clone redo log file to the clone virtual disk in response to the received request, wherein creating the second active link includes converting the passive link to an active link.

19. The apparatus of claim 18, wherein copying the parent virtual disk to the clone virtual disk includes copying the parent snapshot to a clone snapshot, and wherein the passive link from the clone redo log file to the clone virtual disk is changed to a passive link from the clone redo log file to the clone snapshot.

20. The apparatus of claim 17, the method further comprising: merging the clone redo log file into the clone virtual disk.

* * * * *